PREPARATION OF UNSATURATED ORGANIC COMPOUNDS

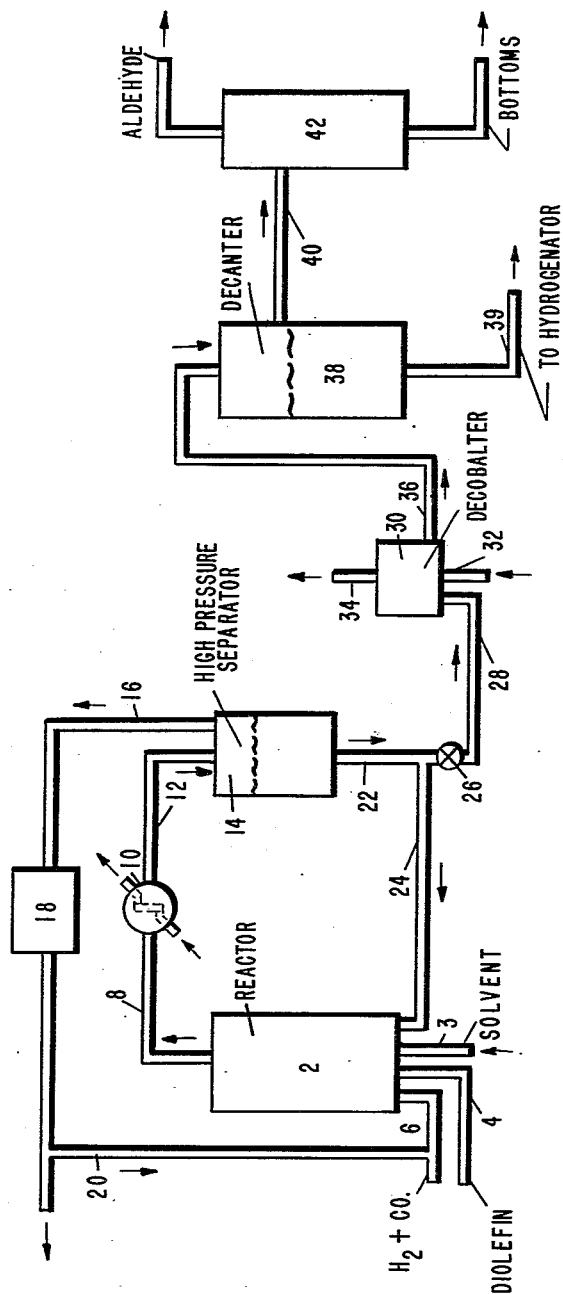
JOHN H. STAIB
FREDERICK KNOTH JR.
JOSEPH STEWART
INVENTORS
BY Henry Berk
ATTORNEY 2,810,748

Joseph Stewart, Cranford, and John H. Staib, Plainfield, N. J., and Frederick Knoth, Jr., Palembang, Sumatra, Indonesia, assignors to Esso Research and Engineering Company, a corporation of Delaware Application March 18, 1954, Serial No. 417,114

8 Claims. (Cl. 260—514)

The present invention relates to the preparation of oxygenated organic compounds by the reaction of carbon monoxide and hydrogen with olefinic hydrocarbons in the presence of a carbonylation catalyst. More specifically, the present invention relates to the preparation of valuable unsaturated aldehydes from diolefins, which compounds have exceptional properties as intermediates in chemical reactions.

The carbonylation, or Oxo reaction, though of only recent development, has proved itself to be a valuable tool in the synthesis of aldehydes and primary alcohols. By means of a reaction involving interaction of olefins, CO and $H_2$ at elevated temperatures and pressures of about 2000 to 4000 p. s. i. g. in the presence of a cobalt catalyst, aldehydes have been obtained in good yields, containing one more carbon atom than the olefin feed, and these aldehydes are readily reducible to the corresponding alcohol or oxidizable to the corresponding acid.

Found suitable for the reaction have been many types of olefins and carbon compounds containing olefinic linkages as well as other groupings. Thus, olefins, olefinic alcohols, esters, olefinic polymers, terpenes, and the like, have all been found suitable as starting material for the aldehyde synthesis process.

In marked contrast to the suitability of the mono-olefins for this process, the diolefins are reported to be unsuitable for oxonation. The Oxo process, when applied to diolefins, instead of producing the expected dialdehydes and glycols, has yielded principally polymeric material, saturated mono-aldehydes and resins. This has been particularly true of conjugated diolefins. Oxonation of conjugated diolefins produced only minor amounts, if any, of dialdehyde and corresponding glycol; for the most part, a saturated mono-aldehyde resulting apparently from oxonation of one olefinic double bond and hydrogenation of the second olefinic linkage resulted.

In the past, irrespective of the type of diolefin subjected to oxonation, it has been found possible to oxonate but a single one of the olefinic linkages to produce saturated aldehydes, for, as pointed out, hitherto both olefinic linkages have participated in the reaction, even though saturated monoaldehydes were recovered. Unsaturated aldehydes have not been found possible to prepare by this process. It would be highly desirable to produce unsaturated monoaldehydes readily and cheaply and on a large scale, as would be possible by a method such as the aldehyde synthesis or Oxo reaction. Not only would the unsaturated aldehydes, or corresponding unsaturated alcohol be an ideal intermediate in the production of polymeric and synthetic fibres, but it would be an intermediate in a host of synthetic reactions. Thus, the monomer may be partially hydrogenated to reduce the aldehyde group to an alcohol, the product polymerized with a peroxide catalyst, and the resulting polymer cross-linked with a dibasic acid. Similarly, such an aldehyde may be oxidized to unsaturated acid, the product polymerized, and the polymer cross-linked by a glycol. Also, the unsaturated alcohol may be converted to an ether to permit the use of Friedel-Crafts polymerization catalyst. The alcohol may also be converted to vinyl ethers with acetylene and the diolefinic ether polymerized with a Friedel-Crafts catalyst well known in the art.

It is, therefore, the principal object of the present invention to prepare mono-olefinic aldehydes from diolefins, by means of the aldehyde synthesis or Oxo reaction.

A further and more specific object of the present invention is the preparation of unsaturated cyclic aldehydes wherein the nucleus has an unsaturated side chain.

A still further object of the present invention is to describe novel monomeric unsaturated aldehyde and acid compositions of high utility as synthetic plastic intermediates.

Other and further objects and results will appear hereinafter.

It has now been found that under certain critical operating techniques disclosed more fully hereinafter, cyclic diolefins, particularly non-conjugated cyclic diolefins, may be converted into unsaturated mono-aldehydes in good yields when reacted with CO and $H_2$ in the presence of a carbonylation catalyst. In particular, cyclic compounds having one olefinic linkage in the ring and one olefinic linkage either in a side chain or in another ring, are adaptable to the process. Thus, it has been found, for example, that 1-vinyl cyclohexene-3 reacts, in the presence of a solvent, with carbon monoxide and hydrogen to give good yields of unsaturated mono-aldehyde containing nine carbon atoms substantially unaccompanied by polymerization and resinification by-products hitherto reported as accompanying and as being the main product in the oxonation of diolefins. Similarly, dicylopentadiene may be converted in good yields to the corresponding unsaturated $C_{11}$ aldehyde.

The present invention will best be understood from the more detailed description hereinafter wherein reference will be made to the accompanying drawing which is a schematic illustration of a system suitable for carrying out a preferred embodiment of the invention. In the drawing and illustration, a more detailed practice of the invention for the preparation of unsaturated aldehydes from specific diolefins are illustrated. For the purpose of illustration 1-vinyl-cyclohexene-3 is employed as the diolefin feed. It will be understood that other non-conjugated diolefins having one olefinic linkage in the ring and a second olefinic linkage on a side chain or in another ring may be employed. Such compounds may also contain other substituent groups such as oxygen, halogen, sulfur, nitrogen, etc., and may have other functional groups.

Referring now to the figure, the diolefin or doubly unsaturated compound is pumped through feed line 4 to the bottom portion of primary reactor 2. The latter comprises a reaction vessel which may, if desired, be packed with non-catalytic material such as Raschig rings, porcelain chips, pumice, and the like, and also, it may be divided into discrete packed zones or it may comprise but a single packed zone or even, if desired, may contain no packing. Concurrently through line 3, there is injected into reactor 2, a solvent adapted to dilute the diolefin. The solvent may be a hydrocarbon such as hexane or heptane which is readily separable from the final product. The proportion of solvent to diolefins may be in the range of 1-2 to 5-1, and preferably is in the range of 2-1 to 5-1.

The diolefin feed may contain dissolved therein 0.1 to 3% by weight on the diolefin, of cobalt naphthenate, stearate, or other high molecular weight cobalt soap. Other compounds of cobalt however may also be used. A gas mixture comprising $H_2$ and CO in the approximate ratio of 0.5 to 2 volumes of $H_2$ per volume of CO is supplied through line 6 to primary reactor 2 and flows concurrently through reactor 2 with the liquid feed. Reactor 2 is preferably operated at pressures of about 2000 to 4000 p. s. i. g., and at a temperature of about 225° to 375° F. An important element of the present process is the residence time of the reactants within reactor 2. Relatively short contact time favors production of unsaturated $C_9$ mono-aldehydes and alcohols, whereas longer residence time favors production of $C_{10}$ glycols. Thus, a short contact time of about 5-10 v./v./hr. is preferred.

Liquid oxygenated reaction products containing some catalyst in solution, in part as the metal carbonyl, and unreacted synthesis gases are withdrawn overhead from an upper portion of high pressure reactor 2 and are transferred through line 8 to cooler 10 in which any conventional means of cooling is employed and from there, via line 12 to high pressure separator 14 where unreacted gases are withdrawn overhead through line 16, scrubbed in scrubber 18 free of entrained liquid and cobalt carbonyl and preferably recycled to reactor 2 via lines 20 and 6.

A stream of primary reaction products containing dissolved therein relatively high concentrations of cobalt carbonyl is withdrawn from separator 14 through line 22. A portion of the withdrawn stream may be recycled to reactor 2 via line 24 to improve selectivity and to aid in temperature control of the primary carbonylation stage. Furthermore, recycling of the primary reaction stage product returns a portion thereof for further contact with catalyst under reaction conditions.

The balance of the primary reaction product may be withdrawn through pressure release valve 26 and through line 28. The withdrawn liquid may comprise unreacted diolefins in solution and secondary reaction products as well as aldehydes and dissolved cobalt carbonyl. It is passed to catalyst removal zone 30 wherein by suitable heat treatment at about 200° to 400° F., the dissolved catalyst is decomposed. As aid to such decomposition, a stream of an inert gas such as hydrogen or a stream of steam may be admitted to zone 30 through line 32 to aid in stripping or decomposing and removing the evolved carbon monoxide resulting from the decomposition of the metal carbonyl. An exit gas stream comprising the purge gas and carbon monoxide may be removed from zone 30 through line 34 and used in any manner desired.

Liquid oxygenated products and solvent now substantially free of carbonylation catalyst are withdrawn from zone 30 through line 36 and passed to decanter 38. Within this vessel, a phase separation occurs. The upper phase comprises hydrocarbon solvent, such as hexane, any unreacted or hydrogenated diolefin, and the desired unsaturated aldehyde. The lower phase may contain di-oxygenated material, such as dialdehyde, which is formed to some extent in this process.

The lower layer may be withdrawn through line 39 and passed to a hydrogenation oven (not shown) for conversion of dialdehydes into the corresponding glycol. The upper layer is withdrawn from decanter 38 through line 40 and passed to distillation zone 42, wherein separation is made between mono-aldehyde and solvent on the one hand, and heavier products on the other. Distillation is preferably carried out under vacuum.

The present invention may be further illustrated by the following specific examples delineating conditions and results when 1-vinyl cyclohexene-3 is oxonated to the unsaturated monoaldehyde.

A charge of 400 cc. of vinyl cyclohexene (3.1 moles), 1200 cc. of hexane and 2.0 grams of cobalt were placed in an autoclave and synthesis gas ($H_2$ and CO) admitted. The temperature was maintained at 130°-150° C. and the pressure at 3300 p. s. i. g. A 10% yield of the $C_9$ unsaturated aldehyde was recovered.

In another run, 5.8 moles of 1-vinyl cyclohexene-3 (750 cc.) were reacted with $H_2$ and CO in the presence of 110 cc. cobalt oleate dissolved in hexane, 750 cc. hexane being the solvent for the reactants. Reaction conditions included temperature of 150° C. and pressures of 3600 p. s. i. g. A product identified as the unsaturated $C_9$ aldehyde, the unsaturation being on the side chain, and having an empirical formula $C_9H_{14}O$ was recovered.

The aldehyde product comprises a mixture of isomeric $C_9$ unsaturated aldehydes having the following structures, as determined by infra red analysis:

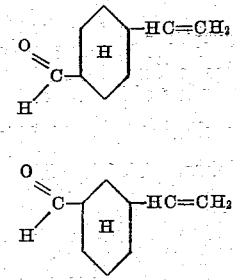

and

Surprisingly, all the oxonation occurred in the ring un-saturation; the vinyl group did not react under the conditions of the run. Normally, terminally located olefinic linkages are preferentially oxonated. There is thus provided a valuable monomeric intermediate for chain type polymerization.

The aldehyde product, a new composition of matter, was characterized as follows:

Molecular weight _____ 138.
Boiling range _____ 190-195° C. (corr.) 110° C. at 30 mm. Hg.
Refractive index $N_D^{20}$ _____ 1.4682.
Density $d^{20}/4$ _____ 0.9261.
Molar refraction (R) _____ (obs.) 41.438.
Molar refraction (R) _____ (calc.) 41.106.

| Elementary Analysis | Experimental | Calculated |
| --- | --- | --- |
| Wt. Percent: | | |
| Carbon | 77.24 | 78.3 |
| Hydrogen | 10.94 | 10.1 |
| Oxygen (Direct) | 12.03 | 11.6 |
| Derivative (2.4 Dinitrophenyl Hydrazone) | M. P. 139.0-139.5° C. | |

The aldehyde thus prepared was in turn subjected to oxidation with nitric acid and the corresponding unsaturated acid recovered by vacuum distillation of the reaction product. The physical properties of this acid, having a formula $C_9H_{14}O_2$, are as follows:

Molecular weight _____ 154.
Boiling range, ° C. _____ 248-250 (corrected to 760 mm.) 108-110 at 3 mm.
Density $d^{20}/4$ _____ 1.042.
Refractive index $N_D^{20}$ _____ 1.4731.
Molar refraction (calc.) ___ 41.58.
Molar refraction (exp.) ___ 41.4.

Since the unsaturated acid has its unsaturation in the vinyl side chain rather than in the nucleus, the acid is an important monomeric intermediate in polymerization and copolymerization reactions. Also, on esterification of the polymerized acid useful products are obtained. Thus, surface coating compounds may be prepared by cross-linking the polymer with glycols, and synthetic lubricants and extreme pressure additives made by esterification with alcohols of from 8 to 20 and higher carbon atoms. The monomeric unsaturated $C_9$ acid is also capable of being polymerized with other unsaturated or polyhydroxy compounds to form resins possessing a wide range of useful properties.

What is claimed is:

1. As a composition of matter an unsaturated cyclic monoaldehyde having 6 carbon atoms in the ring and having the formula $C_9H_{14}O$, the aldehyde grouping and a vinyl grouping being attached to the ring.

2. As a composition of matter, an unsaturated cyclic monocarboxylic acid having 6 carbon atoms in the ring and having the formula $C_9H_{14}O_2$, the carboxyl grouping and a vinyl grouping being attached to the ring.

3. As a composition of matter an unsaturated cyclic oxygenated organic compound having 9 carbon atoms and 14 hydrogen atoms having 6 carbon atoms in the ring and, having a vinyl group attached to said ring and having also attached to said ring a group selected from the class consisting of —COOH and —CHO.

4. A process for the preparation of an unsaturated alicyclic compound which comprises reacting a compound selected from the group consisting of vinyl cyclohexene and dicyclopentadiene in a carbonylation zone with carbon monoxide and hydrogen in the presence of a carbonylation catalyst and a hydrocarbon solvent, maintaining said reaction mixture at a temperature within the range of 225° to 375° F. and a pressure between 2000 to 4000 p. s. i. g., maintaining a short residence time of from 5 to 10 v./v./hr. within said zone and recovering an unsaturated aldehyde having one more carbon atom than said olefinic feed.

5. A process in accordance with claim 4 wherein the unsaturated alicyclic compound is vinyl cyclohexene and the unsaturated aldehyde product contains a vinyl group attached to the ring structure.

6. A process in accordance with claim 4 wherein the unsaturated alicyclic compound is dicyclopentadiene.

7. A process in accordance with claim 4 wherein the ratio of solvent to said alicyclic compound is greater than 2/1.

8. As a composition of matter, a compound selected from the group consisting of the monoaldehyde of dicyclopentadiene wherein the nucleus contains a single double bond and cyclohexane having an aldehyde and vinyl group attached to the ring.

References Cited in the file of this patent

UNITED STATES PATENTS

| | | |
|---|---|---|
| 2,437,600 | Gresham et al. | Mar. 9, 1948 |
| 2,448,368 | Gresham et al. | Aug. 31, 1948 |
| 2,701,816 | Buchner et al. | Feb. 8, 1955 |

FOREIGN PATENTS

| | | |
|---|---|---|
| 493,493 | Belgium | Feb. 15, 1950 |

OTHER REFERENCES

Charles A. Meyer & Co. Inc., English Translation, Oxo Process "Patent applications of the I. G. Farben Industrie Aktiengesellschaft & Ruhrchemie Aktiengesellschaft," chapter 12, pages 31 and 32 (1948).

Doering et al.: J. Am. Chem. Soc. 74, 3000–1 (1952).